United States Patent [19]

Takahashi et al.

[11] 4,302,988
[45] Dec. 1, 1981

[54] PLANETARY-ROLLER TRANSMISSION WITH DEFORMABLE CLUTCHING ELEMENT

[75] Inventors: Hisayoshi Takahashi; Shoichi Oda, both of Nagoya; Hiroshi Satoh; Itsuro Sakai, both of Tokyo, all of Japan

[73] Assignees: Mitsubishi Jukogyo Kabushiki Kaisha; Mitsubishi Jidosha Kogyo Kabushiki Kaisha, both of Japan

[21] Appl. No.: 72,894

[22] Filed: Sep. 6, 1979

[30] Foreign Application Priority Data

Jul. 10, 1979 [JP] Japan ................................ 54-87153

[51] Int. Cl.³ .................... F16H 1/30; F16H 13/02; F16D 19/00
[52] U.S. Cl. ..................................... 74/798; 74/206; 192/20; 192/94; 192/88 B
[58] Field of Search ................ 74/798, 206; 192/88 B, 192/88 A, 94, 20

[56] References Cited

U.S. PATENT DOCUMENTS

| | | | |
|---|---|---|---|
| 1,494,166 | 5/1924 | Hamilton | 192/94 |
| 2,193,481 | 3/1940 | Fawick | 192/88 B |
| 2,251,443 | 8/1941 | Fawick | 192/88 B |
| 2,359,516 | 10/1944 | Frank | 192/88 A |
| 2,956,656 | 10/1960 | Becksted | 192/88 B |
| 3,245,286 | 4/1966 | Hewko | 74/798 |
| 3,955,661 | 5/1976 | Popper et al. | 74/798 |
| 3,986,589 | 10/1976 | Ochi et al. | 192/88 B |
| 4,084,482 | 4/1978 | Derrien | 74/798 X |
| 4,197,930 | 4/1980 | Sugahara | 192/88 B |

FOREIGN PATENT DOCUMENTS

| | | | |
|---|---|---|---|
| 3793 | 9/1979 | European Pat. Off. | 74/798 |
| 732449 | 2/1943 | Fed. Rep. of Germany | 192/88 B |
| 1283591 | 12/1961 | France | 192/88 A |
| 6917 | of 1900 | United Kingdom | 192/88 B |
| 1368262 | 9/1974 | United Kingdom | 74/798 |

*Primary Examiner*—Leslie Braun
*Attorney, Agent, or Firm*—McGlew and Tuttle

[57] ABSTRACT

A planetary-roller transmission for transmitting power from one rotating shaft to another by means of a plurality of planet rollers pivotally supported, in contact with the outer periphery of a sun roller fixedly mounted on one rotating shaft and also with the inner periphery of an internal contact ring secured to a stationary member and made unmovable circumferentially of the rotating shaft, by a carrier connected to the other rotating shaft, characterized in that either the internal contact ring or the sun roller or both are in the form of an elastic element or elements adapted to receive, on one side thereof, a compressive force axially of the rotating shafts to change the radius of the element surface in pressure contact with the mating rollers, and a presser device is provided which applies the compressive force to one side of each elastic element and brings the element into or out of engagement with the mating rollers by increasing or decreasing the compressive force.

7 Claims, 10 Drawing Figures

PLANETARY-ROLLER TRANSMISSION WITH DEFORMABLE CLUTCHING ELEMENT

FIELD AND BACKGROUND OF THE INVENTION

This invention relates to a planetary-roller transmission which transmits power by making use of friction developed by rollers in rolling contact.

Figure 1:
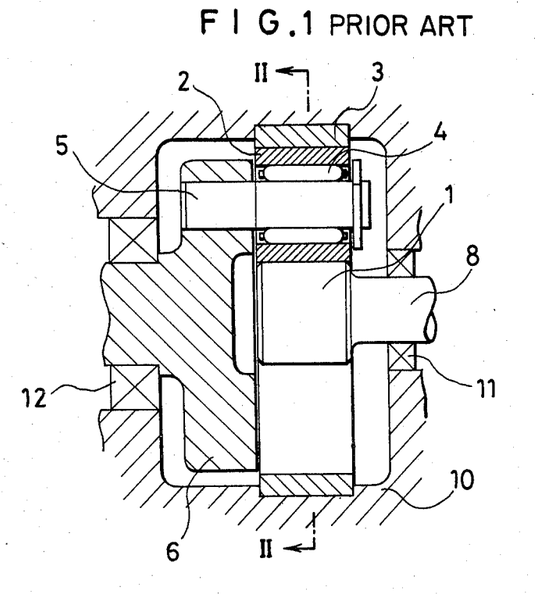
FIG. 1 is a diagrammatic view of a conventional planetary-roller transmission, sectioned along the axis of the input shaft.
Figure 2:
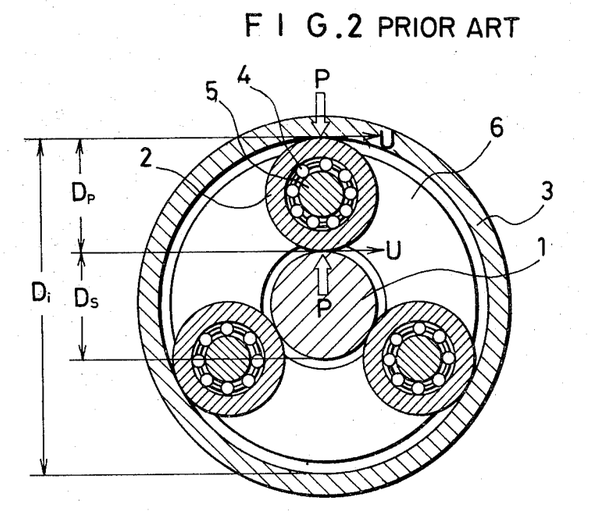
FIG. 2 is a sectional view looking in the direction of the arrows II of FIG. 1.

A conventional transmission system of this character, in an application as a speed reducer, is shown in FIGS. 1 and 2. The numeral 1 designates a sun roller directly mounted on an input shaft 8 which is driven for rotation. 3 is an internal contact ring fixedly secured to a casing 10, and 2 is a plurality of (in this case, three) planet rollers therein rotatably supported, through bearings 4, by planet pins 5, all of which in turn are held by a common carrier 6. 11 and 12 are bearings.

The sun roller 1, the plurality of planet rollers 2, and internal contact ring 3 coact to transmit power through the agency of a frictional force U that results from radial bearing, with a contact pressure P, of the rollers against the encircling ring.

In this arrangement, as indicated in FIG. 2, the components assembled are so made that the inside diameter $D_i$ of the internal contact ring 3 is slightly smaller than the sum of the outside diameter $D_s$ of the sun roller 1 and twice the outside diameter $D_p$ of the planet rollers 2 (that is, $D_s + 2D_p$). It is by the forced contact between the ring and rollers with elastic deformation that the contact pressure P is produced. The arrangement presents the following difficulties:

(1) With the planetary-roller transmission of the type described, the contact pressure P is usually set to a constant predetermined value and hence the frictional force U through the agency of which the power is transmitted is constant, too. Therefore, the transmission is devoid of clutch functions for drivingly connecting or disconnecting two working parts. If the transmission is subjected to an overload, the planet rollers 2, sun roller 1, and internal contact ring 3 can be seized due to excessive slippage between their contacting surfaces, making the operation no longer possible.

(2) Generally, the transmission of this type is seldom used alone; in most cases the mechanism is incorporated as an element in one of varied power-transmitting circuits. In the latter cases, from the viewpoints of machine performance, safety, and ease of maintenance and inspection, if is often necessary for the practical purposes to cut off or reconnect the transmission of power temporarily at the front or rear of the mechanism while in or out of operation. In such an event, the requirement will not be met because the conventional transmission lacks the power cutoff or reconnecting, or clutching, functions.

Figure 3:
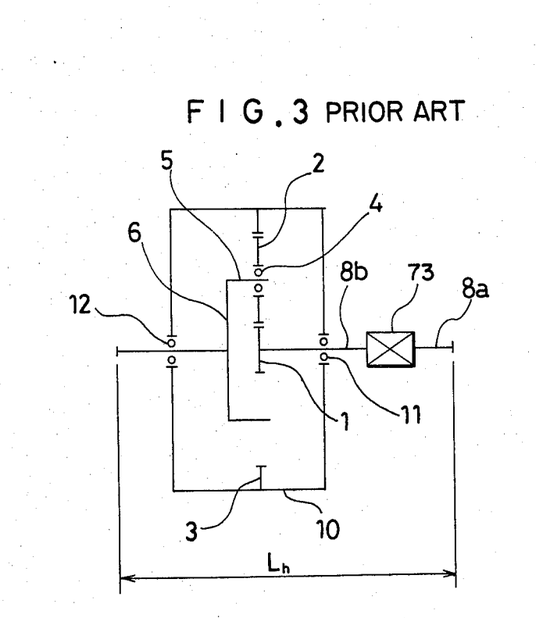
FIGS. 3 and 4 are schematic diagrams of power systems using conventional planetary-roller transmission of modified types.
Figure 4:
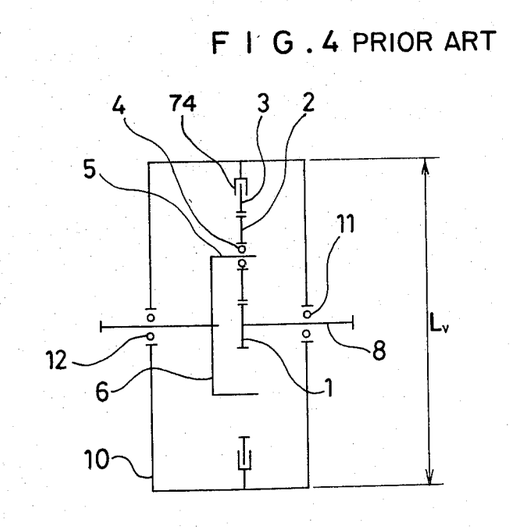

In order to overcome these problems, modified arrangements as illustrated in FIGS. 3 and 4 have been provided.

The system shown in FIG. 3 has a clutch 73 interposed between input shafts 8a and 8b, so that the power from the input shaft 8a is delivered to the transmission or cut off by the engaging or disengaging action of the clutch 73.

In that event, the installation of the clutch 73 calls for an added mounting space Lh axially of the transmission. Moreover, the manufacturing cost of the clutch 73 naturally raises the total cost of the transmission.

In FIG. 4 the clutch 74 is located between the internal contact ring 3 and the casing 10 and the engaging or disengaging action of the clutch locks the internal contact ring 3 or sets it free.

In this case the radial dimension Lv of the transmission is increased, again adding appreciably to the overall cost of the mechanism.

Parts in FIGS. 3 and 4 like or similar to those in FIGS. 1 and 2 are indicated by like numerals.

SUMMARY OF THE INVENTION

The present invention has been perfected with the foregoing in view and has for its object to provide a planetary-roller transmission which, with component elements having clutch functions, light weight, is compact in design, and is made at low cost.

The invention resides, in essence, in a planetary-roller transmission for transmitting power from one rotating shaft to another by means of a plurality of planet rollers pivotally supported, in contact with the outer periphery of a sun roller fixedly mounted on one rotating shaft and also with the inner periphery of an internal contact ring secured to a stationary member and made unmovable circumferentially of the rotating shaft, by a carrier connected to the other rotating shaft, characterized in that either the internal contact ring or the sun roller or both are in the form of an elastic element or elements adapted to be imparted on one side with a compressive force axially of the rotating shafts to change the radius of the element surface in pressure contact with the mating rollers, and presser means is provided which applies the compressive force to one side of each elastic element and brings the element into or out of engagement with the mating rollers by increasing or decreasing the compressive force.

With the construction briefly summarized above, the present invention offers the following advantages:

(1) A planetary-roller transmission whose component members themselves function as a clutch has been realized, turning the impossibility with conventional transmissions of this character into a possibility. As compared with the existing arrangements which include clutches as adjuncts, the transmission of the invention with the integral clutch means is lighter in weight, smaller in size, and much lower in manufacturing cost.

(2) Since the clutch according to the invention is drivingly engaged or disengaged by merely adjusting the pressure of a working fluid acting on one side of an elastic roller or ring, the transmission system incorporating the invention can be clutched or declutched as desired, whether in operation or not, without the necessity of temporarily stopping the apparatus to shift the clutch.

(3) The apparatus of the invention can be protected against overload by combining it with a load torque detector so that, when the load torque of the transmission system exceeds a predetermined critical value, the pressure of the working fluid is decreased and the clutch is disengaged to cut off the transmission.

The above and other objects, features, and advantages of the invention will become more apparent from the following detailed description taken in conjunction with the accompanying drawings.

DESCRIPTION OF THE PREFERRED EMBODIMENTS

Figure 5:
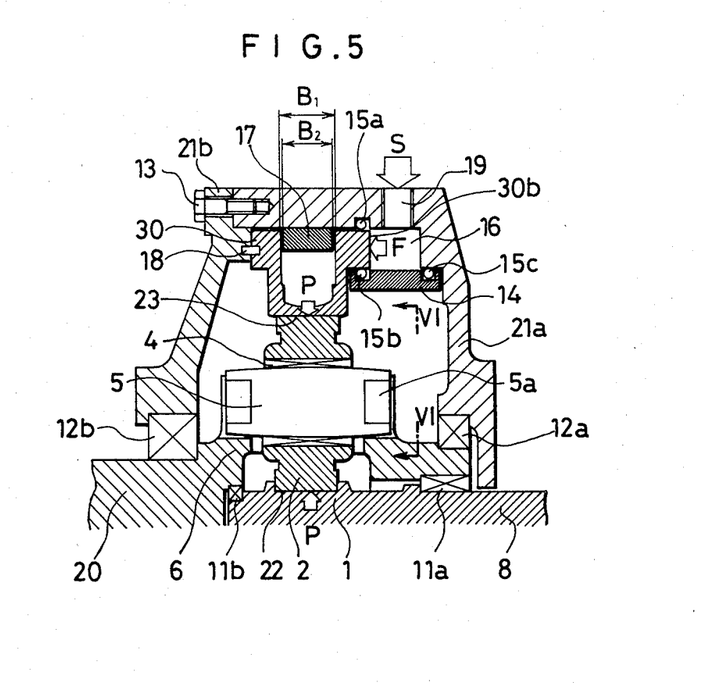
FIG. 5 is a partly sectional view of an embodiment of the invention, taken along the axis of the input shaft.
Figure 6:
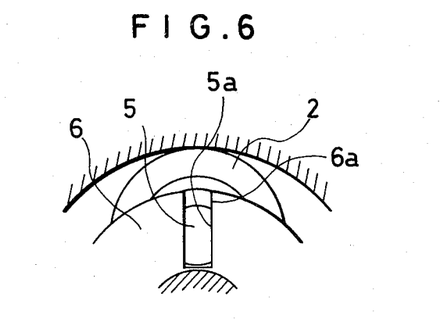
FIG. 6 is a view looking in the direction of the arrows VI—VI of FIG. 5.
Figure 7:
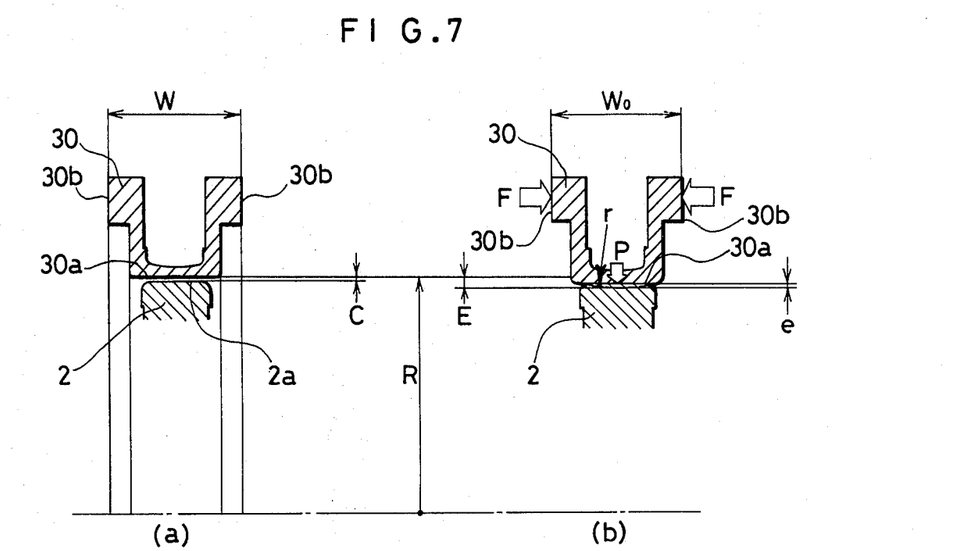
FIG. 7 is a pair of sectional views of an elastic ring.

Referring now to FIGS. 5 through 7, the first embodiment of the invention will be described. The numeral 1 indicates a sun roller mounted on an input shaft 8. A plurality of (in this embodiment, three) planet rollers, indicated at 2, are supported by planet pins 5 through bearings 4. 6 is a carrier mounted on an output shaft 20. As shown in FIG. 6, each planet pin 5 is radially movably supported by the carrier 6, with tabs 5a formed at both ends fitted in radial slots 6a formed in the carrier.

The numerals 11a, 11b are bearings for the input shaft 8, and 12a, 12b are bearings for the carrier 6 and the output shaft 20.

30 is an internal contact ring, or an elastic ring, having a U-shaped cross section.

The elastic ring 30 is made of a wear-resistant steel and, as indicated at (a) and (b) in FIG. 7, it is of such a contour that, as the width W is reduced to Wo upon subjection of the both side portions 30b to an inwardly directed compressive force F, the radius r of the ring up to the inner periphery 30a will decrease accordingly.

21a is a front half of the casing, 21b is the rear half of the casing, the two halves being fastened together by bolts 13.

The elastic ring 30, as shown in FIG. 5, is secured on one side to the rear half casing 21b by pins 18 and is exposed on the other side to a fluid chamber 16 surrounded and formed by the inner wall of the front half casing 21a and the outer peripheral surface of an annular inner sleeve 14.

Into the fluid chamber 16 is introduced a working fluid S under pressure through a fluid inlet 19. The fluid S, acting on the side 30b of the elastic ring 30, produces an axial compressive force F.

A spacer 17 is fitted in the gap between the two side walls of the U-shaped elastic ring 30, with a width $B_2$ slightly narrower than the width $B_1$ of the ring 30. O-rings 15a, 15b, 15c are used to seal the working fluid in the fluid chamber 16.

As will be explained later, the elastic ring is incorporated in the transmission in such a manner that, when the pressure of the working fluid S is too low to maintain a predetermined compressive force F against the side portion 30b of the ring 30, a clearance C will be provided between the inner peripheral surface 30a of the ring and the outer peripheral surface 2a of each planet roller 2 (FIG. 7(a)) and, when the compressive force F exceeds a predetermined level, the inner peripheral surface 30a will be urged into contact with the outer peripheral surface 2a, thus developing a contact pressure P.

In the arrangement described above, the working fluid under pressure at a predetermined value introduced into the fluid chamber 16 will develop an axial compressive force F proportional to the pressure of the fluid S. If the force F exceeds a predetermined value, the width W of the elastic ring 30 will be reduced and therefore the radius of the ring up to the inner peripheral surface 30a will decrease until the surface 30a is pressed against the outer peripheral surface 2a of the planet roller 2 giving birth to the contact pressure P.

Turning to FIG. 7, if a compressive force F is applied on the side portions 30b, the axial width W of the elastic ring 30 will decrease to Wo, with the consequence that the surface 30a of the ring 30 in pressure contact with each planet roller 2 will undergo a crowning deformation E having a radius of curvature r (FIG. 7(b)). Surface 30a is carried on the web of U-shaped ring 30.

This crowning deformation E is restrained to free deformation e where the sun roller 1 and planet rollers 2 are incorporated within the elastic ring. As a result, a contact pressure P corresponding to the amount of free deformation e is produced.

Since the amount of crowning deformation E increases generally in direct proportion to the compressive force F, it is desirable to provide a properly small assembly clearance C between the elastic ring 30 and the planet rollers 2 as compared with the crowning E. Then, a substantially proportional relation will be established between the compressive force F and the contact pressure P.

As described above, the planetary-roller transmission according to this invention is allowed to have clutch functions by changing the compressive force F acting on the side surface 30b of the elastic ring 30.

The clutch functions are as explained below:

(1) When the compressive force F is below the predetermined level. (This includes the case where no compressive force F is applied. Refer to FIG. 7(a).)

As long as the pressure of the working fluid S is low and the compressive force F is less than the predetermined value, the assembly clearance C is left between the elastic ring 30 and each planet roller 2. Therefore, the planet rollers will merely run idle if the input shaft 8 is rotated. The carrier 6 will remain stationary, and the transmission of power from the input shaft 8 to the output shaft 20 will be cut off. In other words, the two working parts remain disconnected by the clutch means.

(2) When the compressive force F is above the predetermined level. (Refer to FIG. 7(b).)

As the pressure of the working fluid S increases and the compressive force F exceeds the predetermined value, the force F will reduce the width of the elastic ring 30 from W to Wo and, at the same time, it will decrease the radius R of the inner periphery 30a of the elastic ring 30, reducing the assembly clearance C to naught and producing the contact pressure P between the elastic ring 30 and the sun roller 1. With this contact pressure P, the planet rollers 2, sun roller 1, and elastic ring 30 are pressed against one another.

In this state the input shaft 8 is driven for rotation, and then the sun roller 1 rotates and the planet rollers 2 revolve therearound in the orbit between the sun roller 1 and the elastic ring 30. Consequently, the carrier 6 and the output shaft 20 directly connected thereto are caused to rotate in the same direction as the input shaft 8. Thus, at the pressure contact areas 22, 23 between the sun roller 1 and the planet rollers 2 and between the planet rollers and the elastic ring 30, there are generated frictional forces $U = Ct \cdot P$ (where Ct is a coefficient of rolling friction) and a power corresponding to the frictional forces is transmitted between the input shaft 8 and the output shaft 20. In other words, the clutch means is engaged for power transmission.

If the pressure inside the fluid chamber 16 becomes excessive, the inner side surfaces of the elastic ring 30 are forced into contact with the both side surfaces of the spacer 17 (so that $B_1 = B_2$ in FIG. 5) to prevent narrowing of the width $B_1$ and also an excessive increase in the contact pressure P.

As stated above, the apparatus according to the present invention has the following advantages:

(1) The clutch can be engaged or disengaged by changing the pressure of the working fluid S in the fluid chamber, whether the transmission is in or out of operation.

(2) A gradual increase in the pressure of the working fluid S permits acceleration of the driven body coupled to the output shaft.

(3) The apparatus can be protected against overload when it is combined with a load torque detector, because it can declutched by the action of the detector upon subjection to an excessive load.

Figure 8:
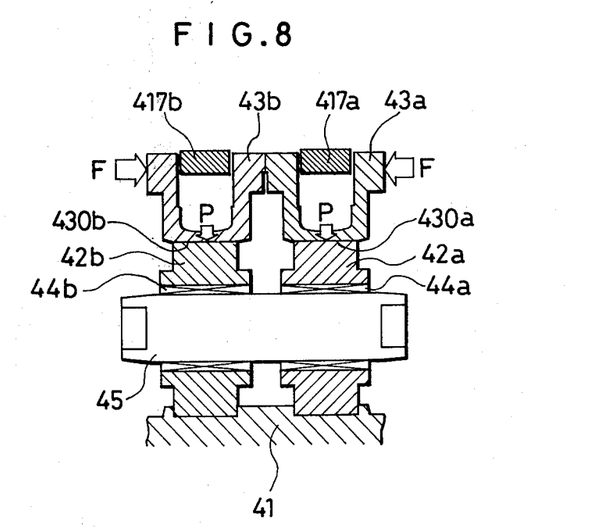
FIG. 8 is a sectional view of essential parts of another embodiment of the invention.

FIG. 8 shows essential parts of another embodiment of the invention. Here the planet rollers and the inner contact ring (elastic ring) are provided in a plurality of (in this case, two) rows. In the FIG. 41 is a sun roller, 43a, 43b are contact rings in the form of elastic rings, 44a, 44b are bearings, 45 is a planet pin, and 417a, 417b are spacers.

In the embodiment shown in FIG. 8, the same compressive force F as in the first embodiment of FIGS. 5 through 7 is exerted to produce the same contact pressure P separately at the pressure contact areas 430a, 430b between the planet rollers 42a, 42b and the elastic rings 43a, 43b. Accordingly, the arrangement is able to transmit twice as much power as the first embodiment can.

Where the machine connected to and driven by this transmission involves very heavy inertial load and the rotational velocity for accelerating the driven machine is very high, seizure of the pressure contact areas 430a, 430b can frequently take place due to an excessive combined work done during the acceleration. The possibility of such trouble can be precluded in accordance with the invention by an increased transmission capacity with the plural rows of the planet rollers 42a, 42b, inner contact rings 43a, 43b, etc. as in the second embodiment.

Figure 9:
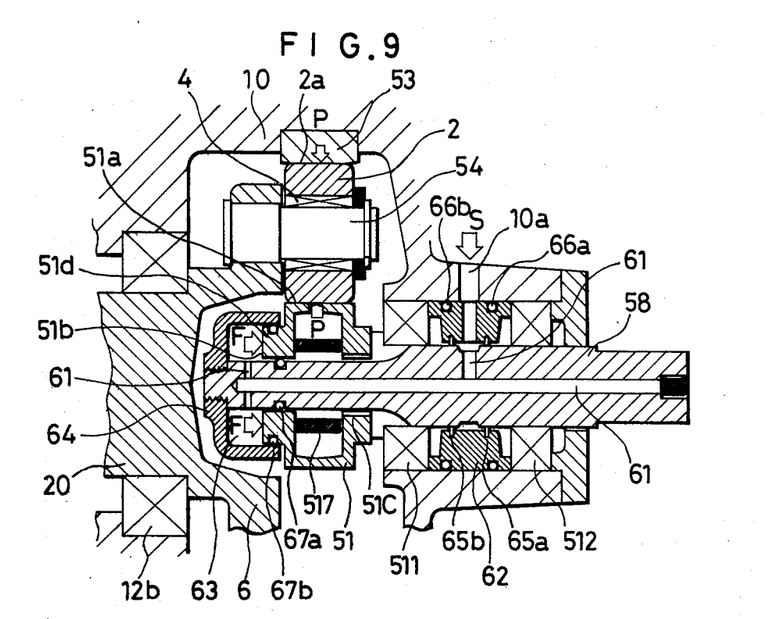
FIGS. 9 and 10 are views corresponding to FIG. 5 but showing still other embodiments of the invention.

FIG. 9 shows still another embodiment of the invention. In this case the sun roller takes the form of an elastic roller 51. As a compressive force F is applied to one side of the elastic roller 51, a contact pressure P is generated. In FIG. 9, there are shown the sun roller, or elastic roller 51, U-shaped in cross section, an internal contact ring 53 secured to a casing 10, an input shaft 58, a plurality of (in this case, three) planet pins 54 held by a carrier 6, planet rollers 2, bearings 4 for the planet rollers 2, an output shaft 20, and bearings 12b, 511, 512. The elastic roller 51 is splined at one end 51c to the input shaft 58 and is axially movably engaged at the other end 51b with the shaft. The input shaft 58 is formed with fluid passages 61, in which working fluid S is introduced from an oil inlet 10a of the casing 10 through a seal assembly 62. A fluid chamber 63, formed inside a retainer 64 secured to the end of the input shaft 58, communicates with the fluid passages 61 to receive the working fluid S. One side 51b of the elastic roller 51 is exposed to the fluid chamber 63 so as to receive the pressure of the working fluid S in the fluid chamber 63. An annular spacer 517 is provided to confine the deformation of the elastic roller 51 axially of the input shaft 58. 65a, 65b are seal rings for sealing the working fluid S, and 66a, 66b, 67a, 67b are O-rings.

The elastic roller 51 is incorporated in the transmission in such a manner that it maintains a predetermined assembly clearance between its outer peripheral surface 51a and the outer peripheral surface 2a of each planet roller 2 when the fluid chamber 63 is free of the working fluid S or when the compressive force F by the fluid S is less than a predetermined value. Once the compressive force F exceeds the predetermined value, the both outer peripheral surfaces 51a, 2a are pressed against each other, developing a contact pressure P.

The operation of the apparatus is similar to that of the first embodiment shown in FIGS. 5 to 7. While the fluid chamber 63 is free of the working fluid S or as long as the compressive force F generated by the fluid is less than the predetermined value, the assembly clearance remains unaffected between the outer peripheral surface 51a of the elastic roller 51 and the outer peripheral surface 2a of each planet roller 2, the rotation of the input shaft 8 is not transmitted to the output shaft 20, and the clutch remains disengaged.

When the working fluid S under pressure has been introduced into the fluid chamber 63 and the compressive force F is increased by the incoming fluid beyond the predetermined value, the elastic roller 51 is compressed by the force F axially of the input shaft 58, with the result and its overall width is decreased and the radius of its outer periphery 51a is increased, eliminating the assembly clearance and bringing the both outer peripheral surfaces 51a and 2a in pressure contact. Consequently, the elastic roller (sun roller) 51, planet rollers 2, and internal contact ring 53 are pressed against one another with the contact pressure P. If the input shaft 8 is rotated in this state, the planet rollers 2 will revolve therearound in the orbit formed between the sun roller 51 and the internal contact ring 53, and the rotation of the input shaft 8 is transmitted to the output shaft 20 through the carrier 6. Thus, the clutch is engaged.

With the functions described above, the embodiment shown in FIG. 9 achieves the same effect as the first embodiment of FIGS. 5 to 7.

Figure 10:
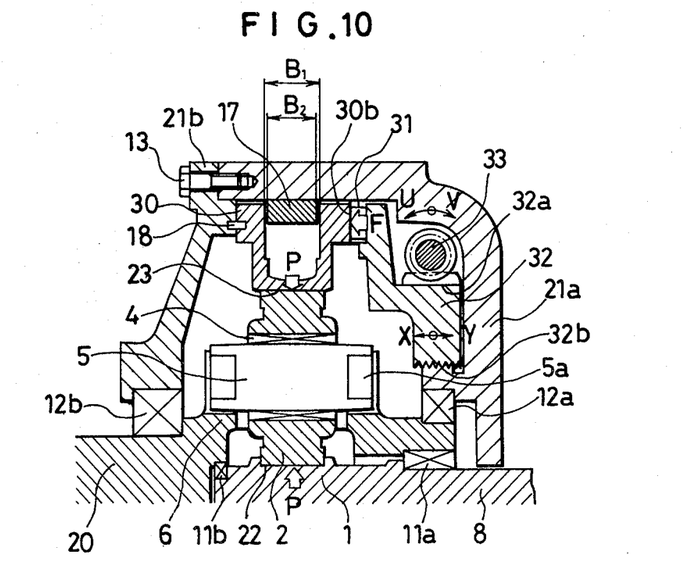

FIG. 10 shows yet another embodiment of the invention, in which the parts indicated by numerals like those in FIG. 5 have like functions and the description is omitted. In this figure, the elastic internal contact ring 30 is fastened on one side to the rear half casing 21b by pins 18 and the other side surface 30b is connected to a presser 32 through a bearing 31. The presser 32 is formed with worm teeth 32a, which in turn mesh with a worm 33. The inner periphery of the presser 32 is threaded at 32b for engagement with a correspondingly threaded portion of the front half casing 21a. Although not shown, the worm 33 is journaled at both ends in the front half casing 21a and its reduced-diameter stem is extended out of the casing and linked to controls (not shown) for manipulating the worm from the outside.

The elastic ring 30 is incorporated in the transmission in such a manner that, when the presser 32 is out of place or located at right as viewed in FIG. 10 (in the direction of the arrow Y), an assembly clearance C (FIG. 7) is formed between its inner periphery 30a and the outer periphery 2a of each planet roller 2 and, when the presser is located at left (in the direction X), the clearance C is reduced to zero.

In this embodiment, when the presser 32 is at right (in the direction Y) in FIG. 10, the elastic ring 30 is not compressed axially of the rotating shaft and therefore the assembly clearance C is formed between the inner periphery 30a of the ring and the outer periphery 2a of each planet roller 2. Consequently, the planet rollers 2 run without load despite the rotation of the input shaft 8 and the sun roller 1 thereon, with the result that the rotation of the input shaft 8 is not transmitted to the output shaft 20. In other words, the clutch is disengaged.

Now if the worm 33 is turned, for example, in the direction of the arrow U in FIG. 10 by controls not shown, the presser 32 with its worm teeth 32a in mesh with the worm 33 is caused to rotate around the axis of the input shaft 8. Accordingly, the threaded portion 32b of the presser 32 in engagement with the front half casing 21a causes the presser to move leftwardly as viewed in FIG. 10 (in the direction of the arrow X) to press the side surface 30b of the elastic ring 30 with a compressive force F. As the compressive force F exceeds a predetermined value with a further movement of the presser 32 in the direction X of FIG. 10, the elastic ring 30 is reduced in width and the radius of its inner peripheral surface 30a is decreased until the surface 30a is pressed against the outer peripheral surface 2a of each planet roller 2, developing a contact pressure P.

While the illustration is omitted, it is also possible to use a sun roller 1 of an elastic material and press the elastic roller by means of a member having the same function as the above-mentioned presser 32.

What is claimed is:

1. A planetary-roller transmission comprising:
   a casing having a roller contact surface;
   an input shaft rotatably mounted to said casing having a roller contact surface;
   an output shaft rotatably mounted to said casing;
   at least one planetary roller rotatably mounted to said output shaft having a roller contact surface engageable with said roller contact surfaces of said casing and said input shaft;
   at least one of said input shaft and casing roller contact surfaces comprising a U-shaped contact ring having an axially extending web which carries said roller contact surface and a pair of radially extending legs extending from said web; and
   pressure means connected to said at least one of said input shaft and casing for moving one of said legs axially closer to the other of said legs to form a crown in said web and bring said roller contact surface of said web into contact with said roller contact surface of said at least one planetary roller.

2. A planetary-roller transmission according to claim 1, wherein said U-shaped contact ring is connected to said casing, said pressure means comprising said casing having a chamber defined therein communicating with an outer surface of said one of said legs of said contact ring, said chamber having a pressure fluid supply conduit communicating therewith for supplying said chamber with pressurized fluid to move said one leg axially closer to the other of said pair of legs.

3. A planetary roller transmission according to claim 1, wherein said U-shaped contact ring is connected to said casing, said pressing means comprising a sleeve threadably mounted to said casing and axially displaceable with respect to said contact ring, a worm gear rotatably mounted to said casing and meshed with a gear on said sleeve for rotating said sleeve to displace said sleeve axially, said sleeve contactable with said one leg for moving said one leg axially closer to said other leg.

4. A planetary-roller transmission device for transmitting power from one rotating shaft to another by means of a plurality of planet rollers so supported by a carrier connected to said other rotating shaft as to be in contact with the outer periphery of a sun roller fixedly mounted on said one rotating shaft and also in contact with the inner periphery of an internal contact ring secured to a stationary member and made immovable circumferentially of said one rotating shaft, characterized in that at least one of said internal contact ring and said sun roller are provided in the form of an elastic roller or elastic rollers of U shape in cross section respectively so that it can be reduced in width under an axially compressive force of said one rotating shaft and its pressure contact surface with the mating rollers transformed into a crowned shape until its radius is changed, and presser means provided for applying said compressive force to one side of said elastic roller to cause it to engage, or be disengaged from, said mating rollers by increasing or decreasing said compressive force.

5. A planetary-roller transmission device, as set forth in claim 4, characterized in that said presser means is a hydraulic presser means in which there is formed an oil chamber demarcated by the lateral surface of said elastic rollers and the inner surface of the casing of said presser means and actuating oil is guided into said oil chamber, so as to transform said elastic rollers in shape by acting on the lateral surface thereof.

6. A planetary-roller transmission device, as set forth in claim 4, characterized in that said presser means consists of a worm wheel to be rotated by a rotating mechanism from outside, a worm gear in meshing engagement with said worm wheel and a presser member adapted to move in the direction of axial line of said rotating shaft.

7. A planetary-roller transmission according to claim 1, wherein said U-shaped contact ring is fixedly mounted to said input shaft, said pressure means comprising a chamber defined by a portion of said input shaft and a surface of said one leg, a pressure fluid conduit connected to said chamber for supplying fluid under pressure to said chamber to move said one leg axially closer to said other leg.

* * * * *

UNITED STATES PATENT AND TRADEMARK OFFICE
CERTIFICATE OF CORRECTION

PATENT NO. : 4,302,988

DATED : December 1, 1981

INVENTOR(S) : Hisayoshi Takahashi et al.

It is certified that error appears in the above—identified patent and that said Letters Patent is hereby corrected as shown below:

On the Title page, Item [30] Foreign Application Priority Data add:
-- July 23, 1979 [JP] Japan 54-101596 --.

Signed and Sealed this

Fifth Day of October 1982

[SEAL]

Attest:

Attesting Officer

GERALD J. MOSSINGHOFF

Commissioner of Patents and Trademarks